(12) United States Patent
Peduzzi et al.

(10) Patent No.: US 7,356,127 B2
(45) Date of Patent: Apr. 8, 2008

(54) GLOBAL DIGITAL MEASUREMENT DEVICE

(75) Inventors: David J. Peduzzi, Trafford, PA (US);
Roger A. Smith, Gibsonia, PA (US)

(73) Assignee: Tollgrade Communications, Inc.,
Wilmington, DE (US)

( * ) Notice: Subject to any disclaimer, the term of this patent is extended or adjusted under 35 U.S.C. 154(b) by 514 days.

(21) Appl. No.: 10/509,963

(22) PCT Filed: Apr. 10, 2003

(86) PCT No.: PCT/US03/11098

§ 371 (c)(1),
(2), (4) Date: May 11, 2005

(87) PCT Pub. No.: WO03/088633

PCT Pub. Date: Oct. 23, 2003

(65) Prior Publication Data

US 2005/0220275 A1    Oct. 6, 2005

(51) Int. Cl.
*H04M 1/24* (2006.01)
*H04M 3/08* (2006.01)
*H04M 3/22* (2006.01)

(52) U.S. Cl. .................. 379/1.03; 379/1.01; 379/22.01; 379/28; 379/29.01

(58) Field of Classification Search ............... 379/1.01, 379/1.03, 22, 22.01, 22.04, 27.01, 28, 29.01, 379/29.05, 30; 370/241, 247–249, 251; 375/224; 398/9, 14, 16, 19
See application file for complete search history.

(56) References Cited

U.S. PATENT DOCUMENTS

| 5,301,050 | A | * | 4/1994 | Czerwiec et al. ............. 398/30 |
| 5,557,672 | A | | 9/1996 | Perry et al. |
| 5,920,609 | A | | 7/1999 | Toumani et al. |
| 6,266,326 | B1 | * | 7/2001 | Harsanyi ..................... 370/248 |
| 6,285,744 | B1 | | 9/2001 | Nero, Jr. et al. |
| 6,320,939 | B1 | | 11/2001 | Nulty et al. |
| 6,404,855 | B2 | | 6/2002 | Beck |

* cited by examiner

*Primary Examiner*—Quoc Tran
(74) *Attorney, Agent, or Firm*—The Webb Law Firm

(57) ABSTRACT

A digital wideband node (DWN) (28, 48) is coupled to a remote terminal (RT) (22, 42) that in turn is coupled to a subscriber's telephone line (26, 46). The DWN (28, 48) is configured to (1) pass a subscriber's telephone number signal directly to the RT (22, 42) whereupon a test path (25, 45) is formed with the subscriber's telephone line (26, 46), (2) pass POTS test signals directly to the RT (22, 42) for testing the subscriber's telephone line (26, 46) via the test path (25, 45) and (3) process wideband test control signals into wideband test signals which are conveyed to the RT (22, 42) for wideband testing of the subscriber's telephone line (26, 46) via the test path (25, 45).

21 Claims, 2 Drawing Sheets

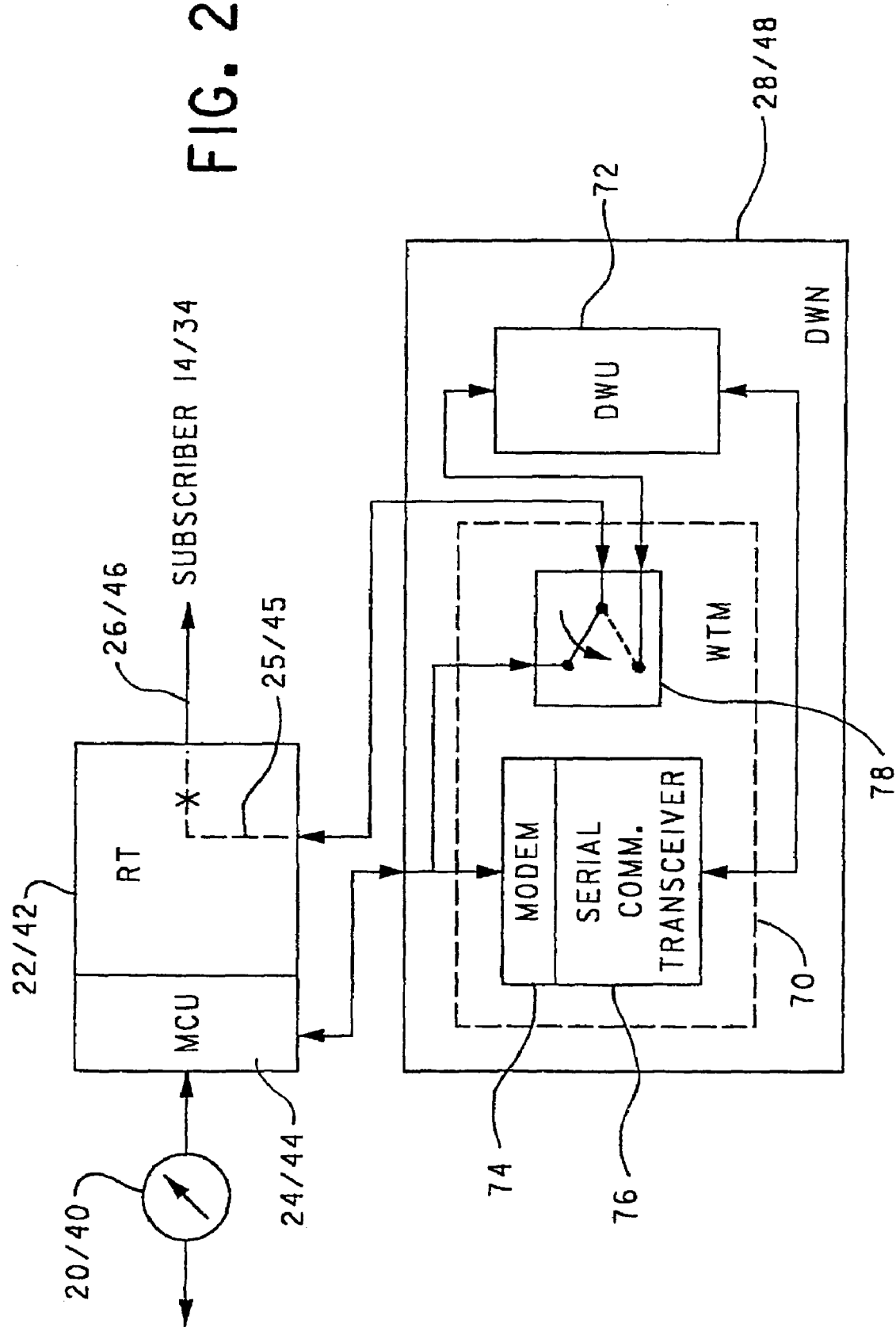

GLOBAL DIGITAL MEASUREMENT DEVICE

BACKGROUND OF THE INVENTION

1. Field of the Invention

The present invention relates to testing of subscribers' telephone lines and telephone equipment connected thereto.

2. Description of Related Art

Remote testing of a subscriber's telephone line, and any telephone equipment connected thereto, via a telephony digital communication network is well known in the art. More specifically, the digital communication network, which in normal operation is utilized to convey voice and/or data communications signals between subscribers, can also be utilized for transmitting plain old telephone service (POTS) test signals from a digital measurement unit (DMU) to the subscriber's telephone line and can transmit the response of the subscriber's telephone line and any connected telephone equipment back to the DMU.

However, telephony digital communication networks in wide use today are not configured to convey signals having a frequency range outside of the standard voice/data communication signals. Hence, when it is desired to conduct wideband testing of the subscriber's telephone line and, hence, any telephone equipment connected thereto, it becomes necessary to provide a separate conductive test path in parallel with the digital communication network in order to facilitate such wideband testing. It is, however, desirable to avoid having to run such separate conductive path to facilitate wideband testing.

It is, therefore, desirable to overcome the above problem and others by providing an apparatus and method for performing both POTS testing and wideband testing of a subscriber's telephone line and any equipment connected thereto via a digital communication network. Still other desirable features of the present invention will become apparent to those of ordinary skill in the art upon reading and understanding the following detailed description.

SUMMARY OF THE INVENTION

The invention is a telephony testing system that includes a digital measurement unit (DMU) operative for outputting a subscriber's telephone number, POTS test signals and wideband test control signals. The system also includes a digital communication network (DCN) including a remote terminal (RT). The test system also includes means for converting the subscriber's telephone number to a subscriber's telephone number signal, for outputting the subscriber's telephone number signal to the DCN, and for routing the POTS signals to the DCN. A digital wideband node (DWN) is coupled to the RT. The DCN conveys the subscriber's telephone number signal, the POTS test signals and the wideband test control signals to the DCN. The DWN routes the subscriber's telephone number signal received via the DCN to the RT whereupon the RT couples the corresponding subscriber's telephone line to the DWN via a test path. The DWN routes POTS test signals received via the DCN to the subscriber's telephone line via the test path. Lastly, the DWN converts the wideband test control signals received via the DCN into wideband test signals which are conveyed to the subscriber's telephone line via the test path.

A response of the subscriber's telephone line to the POTS test signals can be conveyed to the DMU via the DWN and the DCN. A response of the subscriber's telephone line to the wideband test signals can be converted by the DWN into wideband response signals which are conveyed to the DMU via the DCN. Also or alternatively, a response of the subscriber's telephone line to the wideband test signals can be conveyed directly to the DMU via the DWN and the DCN.

The DWN includes a relay, a modem, a serial communication transceiver and a digital wideband unit (DWU). The relay and the modem are coupled to receive the subscriber's telephone number signal, the POTS test signals and the wideband test signals. The relay is operative for forming a path shunting the modem, the transceiver and the DWU whereupon the subscriber's telephone number signal received from the DCN is routed to the RT and the POTS test signals received from the DCN are routed to the subscriber's telephone line. The relay is further operative for opening said shunt path and for coupling the DWU to the RT whereupon the modem conveys the wideband test control signals to the DWU via the transceiver for conversion thereby into the wideband test signals.

The DMU includes a modem which modulates the wideband test control signals utilizing a conventional modem protocol. The DMU outputs the modulated wideband test control signals to the modem of the DWN via the DCN whereupon the modem of the DWN demodulates the wideband test control signals and conveys the demodulated wideband test control signals to the DWU via the transceiver.

The DCN can include means for converting electrical signals conveyed on a conductive line into digital signals for transmission on a digital communication line and vice versa. The digital communication line can be a conductive line or a fiber optic line.

The invention is also a telephony testing system that includes a digital measurement unit (DMU), a digital wideband node (DWN) and a digital communication network (DCN) having a first and communicatively connected to the DMU and a second end communicatively connected to the DWN. The DCN is configured to convey electrical signals from said first end to said second end, and vice versa. The DCN conveys a subscriber's telephone number signal corresponding to a subscriber's telephone number output by the DMU to the DWN whereupon a subscriber's telephone line corresponding to the subscriber's telephone signal is connected to the DWN via a test path. The DCN conveys POTS test signals output by the DMU to the DWN whereupon the POTS test signals are routed to the subscriber's telephone line via the test path. Lastly, the DCN conveys wideband test control signals output by the DMU to the DWN whereupon the wideband test control signals are converted into wideband test signals which are conveyed to the subscriber's telephone line via the test path.

The response of the subscriber's telephone line to the POTS test signals can be conveyed to the DMU via the DWN and the DCN. The response of the subscriber's telephone line to the wideband test signals can be converted by the DWN into wideband response signals which are conveyed to the DMU via the DCN. Also or alternatively, the response of the subscriber's telephone line to the wideband test signals can be conveyed directly to the DMU via the DWN and the DCN.

The invention is also a method of testing a subscriber's telephone line comprising: (a) transmitting a subscriber's telephone number signal, POTS test signals and wideband test control signals to a digital communication network whereupon said signals are converted into digital signal equivalents and then back into corresponding signals; (b) closing a test path to a subscriber's telephone line in response to converting the corresponding subscriber's telephone number signal in step (a); (c) routing the corresponding POTS test signals to the subscriber's telephone line via the test path; (d) converting the corresponding wideband test control signals into wideband test signals; and (e) transmitting the wideband test signals to the subscriber's telephone line via the test path.

The method can also include (f) transmitting a response of the subscriber's telephone line to the POTS test signals over the digital communication network; (g) converting the response of the subscriber's telephone line to the wideband test signals into wideband response signals; (h) transmitting the wideband response signals over the digital communication network; and (i) processing the responses transmitted in steps (f) and (h) to determine at least one characteristic of the subscriber's telephone line.

Lastly, the invention is a telephony testing system that includes a subscriber's telephone line, a remote terminal (RT) coupled to the subscriber's telephone line and a digital wideband node (DWN) coupled to the RT. The DWN is configured to (1) pass a subscriber's telephone number signal directly to the RT whereupon a test path is formed with the subscriber's telephone line, (2) pass POTS test signals directly to the RT for testing the subscriber's telephone line via the test path and (3) process wideband test control signals into wideband test signals which are conveyed to the RT for wideband testing of the subscriber's telephone line via the test path.

The system can also include a digital communication network for conveying each signal from a digital measurement (DMU) to the DWN and for conveying the response of the subscriber's telephone line to the test signals to the DMU.

The POTS test signals can measure at least one of the following conditions of the subscriber's telephone line: AC delta resistance; DC delta resistance; AC voltage; DC voltage; AC current; DC current; and the presence of a load coil. The wideband test signals can measure at least one of the following conditions of the subscriber's telephone line: wideband noise and the presence of a bridged tap.

BRIEF DESCRIPTION OF THE DRAWINGS

FIG. 2 is a detailed block diagram of a digital wideband node shown in FIG. 1 coupled to a remote terminal.

DETAILED DESCRIPTION OF THE INVENTION

Figure 1:
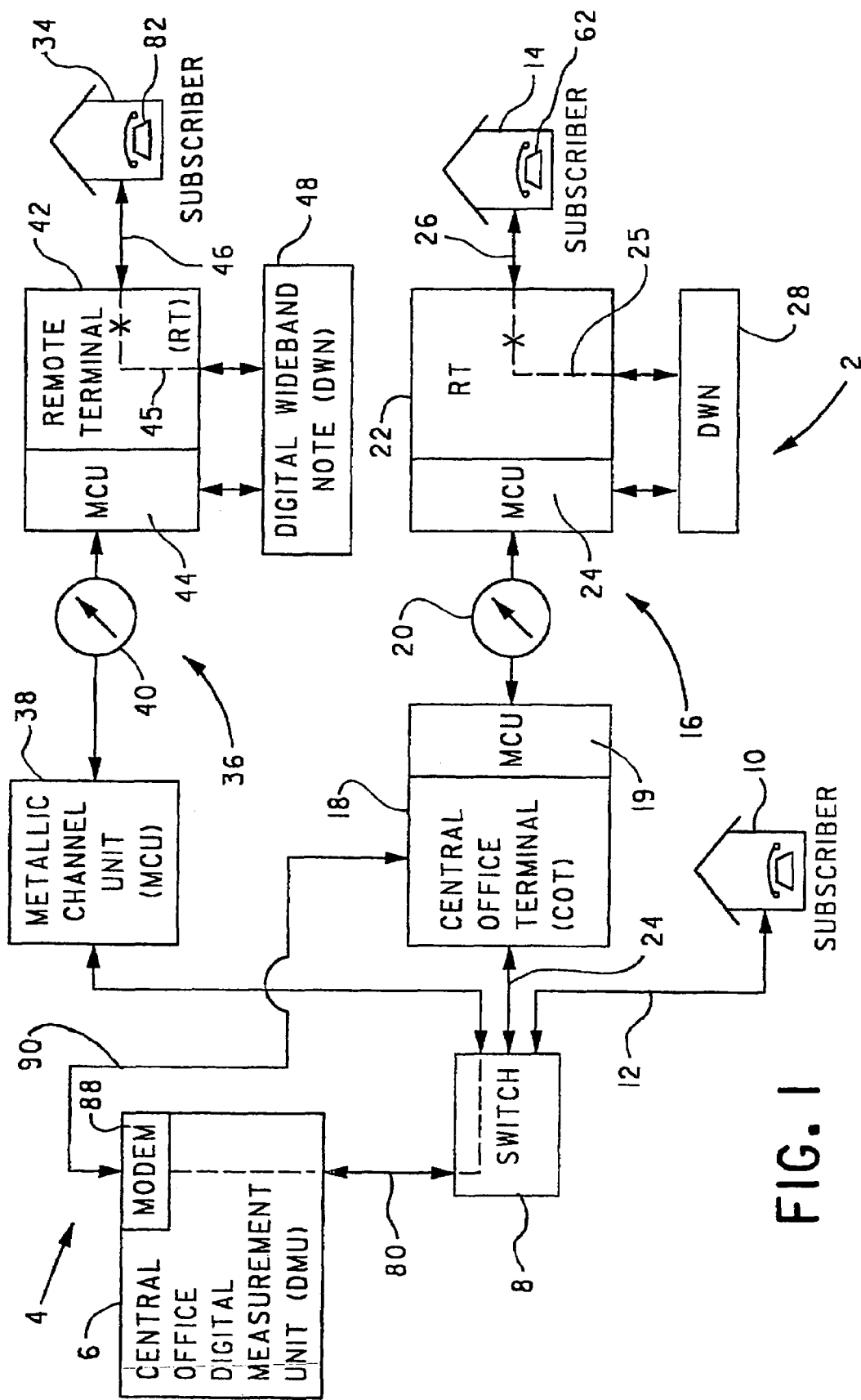
FIG. 1 is a block diagram of a telephony testing system in accordance with the present invention.

With reference to FIG. 1, a telephony test system 2 in accordance with the present invention includes a conventional telephony routing and distribution system 4 and a central office digital measurement unit (DMU) 6.

At minimum, system 4 includes a central office switch 8 for communicatively connecting two or more subscriber telephone lines together in a manner known in the art. The operation of switch 8 is welt known in the art and will only be described herein insofar as it is necessary for an understanding of the invention.

Switch 8 can be directly connected to a subscriber 10 via a conductive line 12, e.g., a tip-ring pair, and to a subscriber 14 via a digital communication network 16 that includes a central office terminal (COT) 18, a digital communication line 20, and a remote terminal (RT) 22. Switch 8 can also be connected to a subscriber 34 via a digital communication network 36 that includes a metallic channel unit (MCU) 38, a digital communication line 40, and a remote terminal 42. Digital communication networks 16 and 36, can be, without limitation, a fiber optic network configured to communicate optically over a fiber optic line or a high speed digital network configured to communicate over a conductive line, such as a tip-ring pair. As shown, COT 18 and RT 22 include MCU's 19 and 24, respectively, connected to opposite ends of digital communication line 20. Similarly, RT 42 includes MCU 44 connected to an end of digital communication line 40 opposite MCU 38. Telephony test system 2 shows the various test connections that are available between subscribers 10, 14 and 34 and DMU 6 via switch 8. Connections between switch 8 and subscribers 10, 14 and 34 for conventional voice/data communications have been omitted for simplicity of illustration.

With reference to FIG. 2, and with continuing reference to FIG. 1, in accordance with the present invention, digital wideband nodes (DWN) 28 and 48 are connected to RT's 22 and 42, respectively. Each DWN 28 and 48 includes a wideband transmission module (WTM) 70 and a digital wideband unit (DWU) 72. Each WTM 70 includes a modem 74, a serial communication transceiver 76 and a relay 78. Since the combination of DWN 28 and RT 22 is the same as the combination of DWN 48 and RT 42, for simplicity of illustration, only one instance of the combination of a DWN and an RT is shown in FIG. 2 wherein certain elements include two reference numbers with the first reference number referring to the combination of DWN 28 and RT 22 and the second reference number referring to the combination of DWN 48 and RT 42. Moreover, since each DWN 28 and 48 are the same, only one set of reference numbers is used in connection with the internal elements thereof.

The operation of telephony test system 2 for testing subscriber's telephone lines and/or telephone equipment connected thereto via a digital communication network will now be described.

When it is desired to test subscriber's telephone line 26 and/or telephone equipment 62 of subscriber 14 connected to telephone line 26, DMU 6 outputs to switch 8 via a conductive line 80 a telephone number associated with subscriber 14. Desirably, conductive line 80 is a numbered test trunk (NTT) that includes a tip-ring pair, a sleeve and a ground. Switch 8 converts this telephone number into a corresponding telephone number signal that switch 8 transmits to RT 22 via MCU 19, digital communication cable 20, MCU 24 and DWN 28. In response to receiving this telephone number signal, RT 22 forms a test path 25 between switch 8 and subscriber's telephone line 26.

Once test path 25 is established, DMU 6 outputs plain old telephone service (POTS) test signals on conductive line 80. These POTS signals are conveyed to subscriber's telephone line and/or telephone line 62 of subscriber 14 via switch 8, MCU 19, digital communication cable 20, MCU 24, DWN 28 and test path 25 of RT 22. For the purpose of conveying the subscriber's telephone number signal to RT 22 and the POTS test signals to the subscriber's telephone line 26, relay 78 of WTM 70 is set to the position shown by the solid line in FIG. 2 whereupon these signals shunt modem 74, transceiver 76 and DWU 72 of DWN 28.

The response of subscriber's telephone line 26 and/or telephone equipment 62 to the POTS test signals is conveyed to DMU 6 via DWN 28 having relay 78 in the position shown by the solid line in FIG. 2, MCU 24, digital communication line 20, MCU 19 and switch 8.

It is well known in the art that POTS test signals and the response of subscriber's telephone line 26 and/or telephone equipment 62 to these POTS test signals operate in the frequency range of conventional telephony voice/data communications. However, it is desirable to also test subscriber's telephone line 26 and/or telephone equipment 62 across a wider band of frequencies than the frequencies utilized for conventional voice/data communication. Unfortunately, MCU's 19 and 24 of COT 18 and RT 22, respectively, are not configured to operate in the range of frequencies needed for direct wideband testing of subscriber's telephone line 26 and/or telephone equipment 62. Accordingly, wideband test signals cannot be communicated to subscriber's telephone line 26 and/or telephone equipment 62 utilizing the telephone communication channel described above for POTS test signals.

To overcome this problem, when DMU 6 determines that it cannot directly apply wideband test signals to subscriber's telephone line 26 and/or telephone equipment 62 of subscriber 14, DMU terminates its attempt to apply these wideband test signals and commences outputting wideband test control signals directly to COT 18 via a modem 88 of DMU 6 and a line 90.

Modem 88 modulates the wideband test control signals utilizing conventional modem protocol. These modulated wideband test control signals operate in the frequency range that MCU's 19 and 34 are configured to operate. Namely, the frequency range of conventional telephony voice/data communications.

Prior to transmitting the modulated test control signals to modem 74 of DWN 28 via digital communication network 16, DMU 6 outputs a control signal that is transmitted via switch 8, MCU 19, digital communication cable 20 and MCU 24 for receipt by WTM 70 of DWN 28. In response to receiving this control signal, WTM 70 of DWN 28 switches relay 78 to the position shown in phantom in FIG. 2. With relay 78 in this position, the path shunting DWU 72, modem 74 and transceiver 76 of DWN 28 is open and DWU 72 of DWN 28 is connected to RT 22.

In response to receiving the modulated wideband test control signals from MCU 24, modem 74 of DWN 28 demodulates the wideband test control signals and conveys the thus demodulated wideband test control signals to transceiver 76 to supply to DWU 72 utilizing conventional serial communication protocol, e.g., the RS-232 protocol. In response to receiving the wideband test control signals from transceiver 78 of DWN 28, DWU 72 of DWN 28 converts the wideband test control signals into wideband test signals that are output to subscriber's telephone line 26 and/or telephone equipment 62 via test path 25 of RT 22.

The wideband response of subscriber's telephone line 26 and/or telephone equipment 62 to the wideband test signals can be measured by DWU 72 of DWN 28 and converted thereby into wideband response signals. These wideband response signals are conveyed to modem 74 of DWN 28 via transceiver 76 of DWN 28. Modem 74 of DWN 28 modulates the wideband response signals utilizing conventional modem protocol and conveys the modulated wideband response signals to modem 88 of DMU 6 via MCU 24, digital communication cable 20 and MCU 19. In response to receiving the modulated wideband response signals, modem 88 demodulates the wideband response signals therefrom and conveys the thus demodulated wideband response signals to DMU 6.

Desirably, the wideband response signals output by DWU 72 of DWN 28 are the interpreted response of subscriber's telephone line 26 and/or telephone equipment 62 to the wideband test signals. In other words, DWU 72 of DWN 28 interprets the response of subscriber's telephone line 26 and/or telephone equipment 62 and conveys the interpreted response to DMU 6 as the wideband response signals.

Some responses of subscriber's telephone line 26 and/or telephone equipment 62 are in the frequency range of conventional voice/data communications, for example, the response of a load coil to the wideband test signals. DWU 72 of DWN 28 can be configured to either convert this response of subscriber's telephone line 26 and/or telephone equipment 62 into interpreted wideband response signals that DWU 72 of DWN 28 transmits to DMU 6 in the manner described above or can convey the uninterpreted response of subscriber's telephone line 26 and/or equipment 62 directly to DMU 6 via transceiver 76 and modem 74 of DWN 28, MCU 24, digital communication line 20, MCU 19 and modem 88. Thus, interpreted wideband response signals or the uninterpreted response of subscriber's telephone 26 and/or telephone equipment 62 to wideband test signals can be conveyed to DMU 6 on the same signal path that DMU 6 utilizes to transmit the wideband test control signals to DWU 72 of DWN 28.

In response to receiving the response to the POTS test signals, the wideband response signals and/or the interpreted response of subscriber's telephone 26 and/or telephone equipment 62 to the wideband test signals, DMU 6 processes these responses to determine one or more characteristics of subscriber's telephone line 26 and/or telephone equipment 62.

With ongoing reference to FIG. 1, digital communication network 36 is similar to digital communication network 16 except that MCU 38 replaces COT 18. When it is desired to test subscriber's telephone line 46 and/or telephone equipment 82 of subscriber 34 connected to telephone line 46, DMU 6 outputs to switch 8 via conductive line 80 a telephone number associated with subscriber 34. Switch 8 converts this telephone number into a corresponding telephone number signal that switch 8 transmits to RT 42 via MCU 38, digital communication line 40, MCU 44 and DWN 48. In response to receiving this telephone signal, RT 42 forms a test path 45 with subscriber's telephone line 46.

Once test path 45 is established, DMU 6 outputs POTS test signals on conductive line 80. These POTS test signals are conveyed to subscriber's telephone line 46 and/or telephone equipment 82 of subscriber 34 via switch 8, MCU 38, digital communication line 40, MCU 44, DWN 48 and test path 45 of RT 42. For the purpose of conveying the subscriber's telephone number signal to RT 42 and the POTS test signals to subscriber's telephone line 46 and/or telephone equipment 82, relay 78 of DWN 48 is set to the position shown by the solid line in FIG. 2 whereupon these signals shunt modem 74 transceiver 76 and DWU 72 of DWN 48.

The response of subscriber's telephone line 46 and/or telephone equipment 82 of subscriber 34 to the POTS test signals is conveyed to DMU 6 via DWN 48 having relay 78 in the position shown in FIG. 2, MCU 44, digital communication line 40, MCU 38 and switch 8.

It is well known in the art that POTS test signals and the response of subscriber's telephone line 46 and/or telephone equipment 82 to these POTS test signals operate in the frequency range of conventional telephony voice/data communications. However, it is desirable to also test subscriber's telephone line 46 and/or telephone equipment 82 across a wider band of frequencies than the frequencies utilized for conventional voice/data communication. Unfortunately, MCU's 38 and 44 are not configured to operate in the range of frequencies needed for direct wideband testing of subscriber's telephone line 46 and/or telephone equipment 82.

Accordingly, wideband test signals cannot be communicated to subscriber's telephone line 46 and/or telephone equipment 82 utilizing the telephone communication channel described above for POTS test signals.

To overcome this problem, when DMU 6 determines that it cannot apply wideband test signals directly to subscriber's telephone line 46 and /or telephone equipment 82 of subscriber 34, DMU 6 terminates its attempt to apply these wideband test signals. Thereafter, DMU 6 redirects the output of modem 88 to switch 8 and causes switch 8 to connect modem 88 to MCU 38.

Modem 88 modulates the wideband test control signals utilizing conventional modem protocol. These modulated wideband test control signals operate in the frequency range that MCU's 38 and 44 are configured to operate. Namely, the frequency range of conventional telephony voice/data communications.

Prior to transmitting the modulated wideband test control signals, DMU 6 outputs a control signal that is transmitted via switch 8, MCU 38, digital communication cable 40 and MCU 44 for receipt by WTM 70 of DWN 48. In response to receiving this control signal, WTM 70 of DWN 48 switches relay 78 to the position shown in phantom in FIG. 2. With relay 78 in this position, the path shunting DWU 72, modem 74 and transceiver 76 of DWN 48 is open and DWU 72 of DWN 48 is connected to RT 42.

In response to receiving the modulated wideband test control signals from MCU 44, modem 74 of DWN 48 demodulates the wideband test control signals and conveys the thus demodulated wideband test control signals to transceiver 76 to supply to DWU 72 of DWN 48 utilizing conventional serial communication protocol. In response to receiving the wideband test control signals from transceiver 78, DWU 72 of DWN 48 converts the wideband test control signals into wideband test signals that are output to subscriber's telephone line 46 and/or telephone equipment 82 via test path 45 of RT 42.

The wideband response of subscriber's telephone line 46 and/or telephone equipment 82 to the wideband test signals can be measured by DWU 72 of DWN 48 and converted thereby into wideband response signals. These wideband response signals are conveyed to modem 74 of DWN 48 via transceiver 78 of DWN 48. Modem 74 of DWN 48 modulates the wideband response signals utilizing conventional modem protocol and conveys the thus modulated wideband response signals to modem 88 via MCU 44, digital communication cable 40, MCU 38 and switch 8. In response to receiving the modulated wideband response signals, modem 88 demodulates the wideband response signals therefrom and conveys the thus demodulated wideband response signals to DMU 6.

Desirably, the wideband response signals output by DWU 72 of DWN 48 are the interpreted response of subscriber's telephone line 46 and/or telephone equipment 82 to the wideband test signals. In other words, DWU 72 of DWN 48 interprets the response of subscriber's telephone line 46 and/or telephone equipment 82 and conveys the interpreted response to DMU 6 as the wideband response signals.

Some responses of subscriber's telephone line 46 and/or telephone equipment 82 are in the frequency range of conventional voice/data communications, for example, the responsive of a load coil to the wideband test signals. DWU 72 of DWN 48 can be configured to either convert this response of subscriber's telephone line 46 and/or telephone equipment 82 into interpreted wideband response signals that DWU 72 of DWN 28 transmits to DMU 6 in the manner described above or can convey the uninterpreted response of subscriber's telephone line 46 and/or equipment 82 directly to DMU 6 via transceiver 76 and modem 74 of DWN 48, MCU 44, digital communication line 40, MCU 38, switch 8 and modem 88. Thus, interpreted wideband response signals or the uninterpreted response of subscriber's telephone 46 and/or telephone equipment 82 to wideband test signals can be conveyed to DMU 6 on the same signal path that DMU 6 utilizes to transmit the wideband test control signals to DWU 72 of DWN 48.

DWU 6 processes-the response of subscriber's telephone line 46 and/or telephone equipment 82 to the POTS test signals, the interpreted wideband response signals or the uninterpreted wideband response signals to determine one or more characteristics of subscriber's telephone line 46 and/or telephone equipment 82.

As can be seen, the present invention enables both POTS tests and wideband tests of subscriber's telephone line 26 or 46 and telephone equipment 62 or 82 to be conducted across digital communication network 16 or 36, respectively. This avoids the need to run separate conductive lines parallel to digital communication network 16 or 36 in order to perform wideband testing of subscriber's telephone line 26 or 46 and/or telephone equipment 62 or 82, respectively.

The invention has been described with reference to the preferred embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A telephony testing system comprising:
   a digital measurement unit (DMU) operative for outputting a subscriber's telephone number, POTS test signals and wideband test control signals;
   digital communication network (DCN) including a remote terminal (RT);
   means for converting the subscriber's telephone number to a subscriber's telephone number signal, for outputting the subscriber's telephone number signal to the DCN and for routing the POTS test signals to the DCN; and
   a digital wideband node (DWN) coupled to the RT, wherein:
   the DCN conveys the subscriber's telephone number signal, the POTS test signals and the wideband test control signals to the DWN;
   the DWN routes the subscriber's telephone number signal received via the DCN to the RT whereupon the RT couples a corresponding subscriber's telephone line to the DWN via a test path;
   the DWN routes POTS test signals received via the DCN to the subscriber's telephone line via the test path; and
   the DWN converts the wideband test control signals received via the DCN into wideband test signals which are conveyed to the subscriber's telephone line via the test path.

2. The system of claim 1, wherein a response of the subscriber's telephone line to the POTS test signals is conveyed to the DMU via the DWN and the DCN.

3. The system of claim 1, wherein a response of the subscriber's telephone line to the wideband test signals is converted by the DWN into wideband response signals which are conveyed to the DMU via the DCN.

4. The system of claim 1, wherein a response of the subscriber's telephone line to the wideband test signals is conveyed to the DMU via the DWN and the DCN.

5. The system of claim 1, wherein the DWN includes a relay, a modem, a serial communication transceiver and a digital wideband unit (DWU), the relay and the modem coupled to receive the subscriber's telephone number signal, the POTS test signals and the wideband test signals, the relay operative for forming a path shunting the modem, the transceiver and the DWU whereupon the subscriber's telephone number signal received from the DCN is routed to the RT and the POTS test signals received from the DCN are routed to the subscriber's telephone line, the relay further operative for opening said shunt path and coupling the DWU to the RT whereupon the modem conveys the wideband test control signals to the DWU via the transceiver for conversion thereby into the wideband test signals.

6. The system of claim 5, wherein the DMU includes a modem which modulates the wideband test control signals utilizing a conventional modem protocol, outputs the modulated wideband test control signals to the modem of the DWN via the DCN whereupon the modem of the DWN demodulates the wideband test control signals and conveys the demodulated wideband test control signals to the DWU via the transceiver.

7. The system of claim 5, wherein the DCN includes means for converting electrical signals conveyed on a conductive line into digital signals for transmission on a digital communication line and vice versa.

8. The system of claim 1, wherein the digital communication line is one of a conductive line and a fiber optic line.

9. A telephony testing system comprising:
a digital measurement unit (DMU);
a digital wideband node (DWN); and
a digital communication network (DCN) having a first end communicatively connected to the DMU and a second end communicatively connected to the DWN, the DCN configured to convey electrical signals from said first end to said second end, and vice versa, wherein:
the DCN conveys a subscriber's telephone number signal corresponding to a subscriber's telephone number output by the DMU to the DWN whereupon a subscriber's telephone line corresponding to the subscriber's telephone number signal is connected to the DWN via a test path;
the DCN conveys POTS test signals output by the DMU to the DWN whereupon the POTS test signals are routed to the subscriber's telephone line via the test path; and
the DCN conveys wideband test control signals output by the DMU to the DWN whereupon the wideband test control signals are converted into wideband test signals which are conveyed to the subscriber's telephone line via the test path.

10. The system of claim 9, wherein the response of the subscriber's telephone line to the POTS test signals is conveyed to the DMU via the DWN and the DCN.

11. The system of claim 9, wherein the response of the subscriber's telephone line to the wideband test signals is converted by the DWN into wideband response signals which are conveyed to the DMU via the DCN.

12. The system of claim 9, wherein the response of the subscriber's telephone line to the wideband test signals is conveyed to the DMU via the DWN and the DCN.

13. The system of claim 9, wherein the DWN includes a relay, a modem, a serial communication transceiver and a digital wideband unit (DWU), the relay and the modem coupled to receive the subscriber's telephone number signal, the POTS test signals and the wideband test signals, the relay operative for forming a path shunting the modem, the transceiver and the DWU whereupon the subscriber's telephone number signal received from the DCN is routed to the RT and the POTS test signals received from the DCN are routed to the subscriber's telephone line, the relay further operative for opening said shunt path and coupling the DWU to the RT whereupon the modem conveys the wideband test control signals to the DWU via the transceiver for conversion thereby into the wideband test signals.

14. The system of claim 9, further including means responsive to the subscriber's telephone number signal for connecting the subscriber's telephone line to the DWN via the test path.

15. The system of claim 9, wherein the DCN includes one of a fiber optic line and a conductive line.

16. A method of testing a subscriber's telephone line comprising:
(a) transmitting a subscriber's telephone number signal, POTS test signals and wideband test control signals to a digital communication network whereupon said signals are converted into digital signal equivalents and then back into corresponding signals;
(b) closing a test path to a subscriber's telephone line in response to converting the corresponding subscriber's telephone number signal in step (a);
(c) routing the corresponding POTS test signals to the subscriber's telephone line via the test path;
(d) converting the corresponding wideband test control signals into wideband test signals; and
(e) transmitting the wideband test signals to the subscriber's telephone line via the test path.

17. The method of claim 16, further including:
(f) transmitting a response of the subscriber's telephone line to the POTS test signals over the digital communication network;
(g) converting the response of the subscriber's telephone line to the wideband test signals into wideband response signals;
(h) transmitting the wideband response signals over the digital communication network; and
(i) processing the responses transmitted in steps (f) and (h) to determine at least one characteristic of the subscriber's telephone line.

18. A telephony testing system comprising:
a subscriber's telephone line;
a remote terminal (RT) coupled to the subscriber's telephone line; and
a digital wideband node (DWN) coupled to the RT, wherein the DWN is configured to (1) pass a subscriber's telephone number signal directly to the RT whereupon a test path is formed with the subscriber's telephone line, (2) pass POTS test signals directly to the RT for testing the subscriber's telephone line via the test path and (3) process wideband test control signals into wideband test signals which are conveyed to the RT for wideband testing of the subscriber's telephone line via the test path.

19. The system of claim 18, further including a digital communication network for conveying each signal from a digital measurement unit (DMU) to the DWN and for conveying the response of the subscriber's telephone line to the test signals to the DMU.

20. The system of claim 19, wherein:
the POTS test signals measure at least one of the following conditions of the subscriber's telephone line:
AC delta resistance;
DC delta resistance;
AC voltage;
DC voltage;
AC current;
DC current; and
the presence of a load coil;
and
the wideband test signals measure at least one of the following conditions of the subscriber's telephone line:
wideband noise; and
the presence of a bridged tap.

21. The system of claim 19, wherein the subscriber's telephone line includes a conductive tip-ring pair having a telephone connected thereto.

* * * * *

UNITED STATES PATENT AND TRADEMARK OFFICE
CERTIFICATE OF CORRECTION

PATENT NO. : 7,356,127 B2  Page 1 of 1
APPLICATION NO. : 10/509963
DATED : April 8, 2008
INVENTOR(S) : Peduzzi et al.

It is certified that error appears in the above-identified patent and that said Letters Patent is hereby corrected as shown below:

<u>Title page</u>, Item (60) Related U.S. Application Data, insert the following:
-- 60/371,456        April 10, 2002        US --

Signed and Sealed this

Sixteenth Day of September, 2008

JON W. DUDAS
*Director of the United States Patent and Trademark Office*